United States Patent
Sinha et al.

(10) Patent No.: US 12,250,302 B2
(45) Date of Patent: *Mar. 11, 2025

(54) QUANTUM CRYPTOGRAPHY IN AN INTERNET KEY EXCHANGE PROCEDURE

(71) Applicant: Juniper Networks, Inc., Sunnyvale, CA (US)

(72) Inventors: Ranjan Sinha, Bangalore (IN); Aswin Surendran, Ernakulam (IN); Priyabrata Saha, Kolkata (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,845

(22) Filed: Sep. 6, 2023

(65) Prior Publication Data
US 2023/0412371 A1 Dec. 21, 2023

Related U.S. Application Data

(63) Continuation of application No. 17/710,100, filed on Mar. 31, 2022, now Pat. No. 11,791,994.

(51) Int. Cl.
  *H04L 29/06* (2006.01)
  *H04L 9/08* (2006.01)
  *H04L 9/40* (2022.01)

(52) U.S. Cl.
  CPC ............ *H04L 9/0852* (2013.01); *H04L 9/083* (2013.01); *H04L 63/06* (2013.01)

(58) Field of Classification Search
  None
  See application file for complete search history.

(56) References Cited

U.S. PATENT DOCUMENTS

| | | | |
|---|---|---|---|
| 7,602,919 B2 | 10/2009 | Berzanskis et al. | |
| 7,890,759 B2 * | 2/2011 | Takeyoshi | H04L 63/0209 380/278 |
| 8,559,640 B2 | 10/2013 | Mohd et al. | |

(Continued)

OTHER PUBLICATIONS

Co-pending U.S. Appl. No. 17/710,100, inventors Sinha; Ranjan et al., filed Mar. 31, 2022.

(Continued)

*Primary Examiner* — Maung T Lwin
(74) *Attorney, Agent, or Firm* — Harrity & Harrity, LLP

(57) ABSTRACT

In some implementations, a first network device may communicate, with a second network device, one or more internet key exchange (IKE) messages to exchange a first identifier associated with the first network device and a second identifier associated with the second network device, and to indicate that a post-quantum preshared key (PPK) is to be used as a shared key for an IKE security association (SA) between the first network device and the second network device. The first network device may obtain, from a key management entity (KME), a quantum key based on providing the second identifier to the KME, wherein the PPK is based on the quantum key. The first network device may communicate, with the second network device, one or more IKE authentication messages to exchange a third identifier associated with the quantum key and to confirm that the second network device successfully obtained the PPK.

20 Claims, 9 Drawing Sheets

(56) References Cited

U.S. PATENT DOCUMENTS

| | | | | |
|---|---|---|---|---|
| 8,762,728 | B2* | 6/2014 | Wiseman | H04L 9/321 380/279 |
| 11,218,471 | B1* | 1/2022 | Stapleton | H04L 63/061 |
| 2007/0136590 | A1* | 6/2007 | Nah | H04W 12/069 713/168 |
| 2015/0188701 | A1* | 7/2015 | Nordholt | H04L 63/061 713/171 |
| 2016/0191478 | A1* | 6/2016 | Pruss | H04W 12/0471 713/171 |
| 2016/0315768 | A1 | 10/2016 | Fu et al. | |
| 2018/0062836 | A1 | 3/2018 | Tanizawa | |
| 2019/0149327 | A1 | 5/2019 | Yuan et al. | |
| 2020/0120408 | A1 | 4/2020 | Boyd et al. | |
| 2020/0351086 | A1 | 11/2020 | Walenta et al. | |
| 2021/0083864 | A1 | 3/2021 | Bush | |
| 2021/0226782 | A1 | 7/2021 | Florit et al. | |
| 2022/0006627 | A1 | 1/2022 | Ko et al. | |
| 2022/0321331 | A1* | 10/2022 | Kisley | H04L 9/0852 |
| 2022/0345300 | A1 | 10/2022 | Inamdar et al. | |
| 2023/0014894 | A1 | 1/2023 | M M et al. | |

OTHER PUBLICATIONS

Extended European Search Report for Application No. EP22174376.8 mailed on Nov. 17, 2022, 12 pages.

Fluhrer et al., "Mixing Preshared Keys in the Internet Key Exchange Protocol Version 2 (IKEv2) for Post-quantum Security," Internet Engineering Task Force (IETF), Jun. 2020, pp. 1-14.

Kaufman C., et al., "RFC—7296 Internet Key Exchange Protocol Version 2 (IKEv2)," An IP.com Prior Art Database Technical Disclosure, Oct. 2014, pp. 1-142.

Marksteiner et al., "On the Resilience of a QKD Key Synchronization Protocol for IPsec," Jan. 5, 2018, pp. 1-18.

Nagayama et al., "IKE for IPsec with QKD," IP Security Maintenance and Extensions (IPSECME), Oct. 27, 2014, pp. 1-18.

Neppach et al., "Key Management of Quantum Generated Keys in IPSEC," Proceedings of the 5 International Conference on Security and Cryptography, SECRYPT 2008 International Conference on Security and Cryptography, pp. 177-183.

SFAXI, "Using Quantum Key Distribution within IPSEC to secure MAN communications," Jan. 2005, pp. 1-16.

* cited by examiner

900

910 — Communicate, with a second network device, one or more internet key exchange (IKE) messages to exchange a first identifier associated with the first network device, a second identifier associated with the second network device, and to indicate that a post-quantum preshared key (PPK) is to be used as a shared key for an IKE security association (SA) between the first network device and the second network device

920 — Obtain, from a key management entity (KME), a quantum key based on providing the second identifier to the KME, wherein the PPK is based on the quantum key

930 — Communicate, with the second network device, one or more IKE authentication messages to exchange a third identifier associated with the quantum key and to confirm that the second network device successfully obtained the PPK

940 — Establish, with the second network device, the IKE SA based on receiving an indication that the second network device successfully obtained the PPK that is based on the quantum key

FIG. 9

QUANTUM CRYPTOGRAPHY IN AN INTERNET KEY EXCHANGE PROCEDURE

RELATED APPLICATION

This application is a continuation of U.S. patent application Ser. No. 17/710,100, filed Mar. 31, 2022, which is incorporated herein by reference in its entirety.

BACKGROUND

Internet Protocol (IP) Security (IPsec) provides confidentiality, data integrity, access control, and/or data source authentication, among other examples, to IP traffic. These services are provided by maintaining shared state between a source network device (e.g., a router, and/or a gateway, among other examples) and a destination network device of the IP traffic. The shared state defines specific services provided to the IP traffic. Cryptographic models may use the shared state to provide the services, and/or keys used as input to the cryptographic models, among other examples.

SUMMARY

Some implementations described herein relate to a method. The method may include transmitting, by a first network device and to a second network device, an internet key exchange (IKE) initiation request message, wherein the IKE initiation request message indicates that a post-quantum preshared key (PPK) is to be used as a shared key for an IKE procedure, and wherein the IKE initiation request message indicates a first identifier associated with the first network device. The method may include receiving, by the first network device and from the second network device, an IKE initiation response message, wherein the IKE initiation response message indicates that the PPK is supported as the shared key for the IKE procedure by the second network device, and wherein the IKE initiation response message indicates a second identifier associated with the second network device. The method may include transmitting, by the first network device and to a key management entity (KME) associated with the first network device, a request for a quantum key, wherein the request for the quantum key indicates the second identifier associated with the second network device, and wherein the PPK is based on the quantum key. The method may include receiving, by the first network device and from the KME, an indication of the quantum key and a third identifier associated with the quantum key. The method may include transmitting, by the first network device and to the second network device, an IKE authentication request message, wherein the IKE authentication request message indicates that the third identifier associated with the quantum key is associated with the PPK. The method may include receiving, by the first network device and from the second network device, an IKE authentication response message, wherein the IKE authentication response message indicates that the PPK has been successfully obtained by the second network device.

Some implementations described herein relate to a first network device. The first network device may include one or more memories and one or more processors. The one or more processors may be configured to receive, from a second network device, an IKE initiation request message, wherein the IKE initiation request message indicates that a PPK is to be used as a shared key for an IKE procedure, and wherein the IKE initiation request message indicates a first identifier associated with the second network device. The one or more processors may be configured to transmit, to the second network device, an IKE initiation response message, wherein the IKE initiation response message indicates that the PPK is supported as the shared key for the IKE procedure by the first network device, and wherein the IKE initiation response message indicates a second identifier associated with the first network device. The one or more processors may be configured to receive, from the second network device, an IKE authentication request message, wherein the IKE authentication request message indicates a third identifier associated with a quantum key that is associated with the PPK. The one or more processors may be configured to transmit, to a KME associated with the first network device, a request for the quantum key, wherein the request for the quantum key indicates the first identifier associated with the second network device and the third identifier associated with the quantum key. The one or more processors may be configured to receive, from the KME, an indication of the quantum key based on transmitting the request. The one or more processors may be configured to transmit, to the second network device, an IKE authentication response message, wherein the IKE authentication response message indicates that the PPK has been successfully obtained by the first network device.

Some implementations described herein relate to a non-transitory computer-readable medium that stores a set of instructions for a first network device. The set of instructions, when executed by one or more processors of the first network device, may cause the first network device to communicate, with a second network device, one or more IKE messages to exchange a first identifier associated with the first network device and a second identifier associated with the second network device, and to indicate that a PPK is to be used as a shared key for an IKE SA between the first network device and the second network device. The set of instructions, when executed by one or more processors of the first network device, may cause the first network device to obtain, from a KME, a quantum key based on providing the second identifier to the KME, wherein the PPK is based on the quantum key. The set of instructions, when executed by one or more processors of the first network device, may cause the first network device to communicate, with the second network device, one or more IKE authentication messages to exchange a third identifier associated with the quantum key and to confirm that the second network device successfully obtained the PPK. The set of instructions, when executed by one or more processors of the first network device, may cause the first network device to establish, with the second network device, the IKE SA based on receiving an indication that the second network device successfully obtained the PPK that is based on the quantum key.

BRIEF DESCRIPTION OF THE DRAWINGS

FIGS. 7-9 are flowcharts of example processes relating to quantum cryptography in an internet key exchange (IKE) procedure.

DETAILED DESCRIPTION

Figure 1:
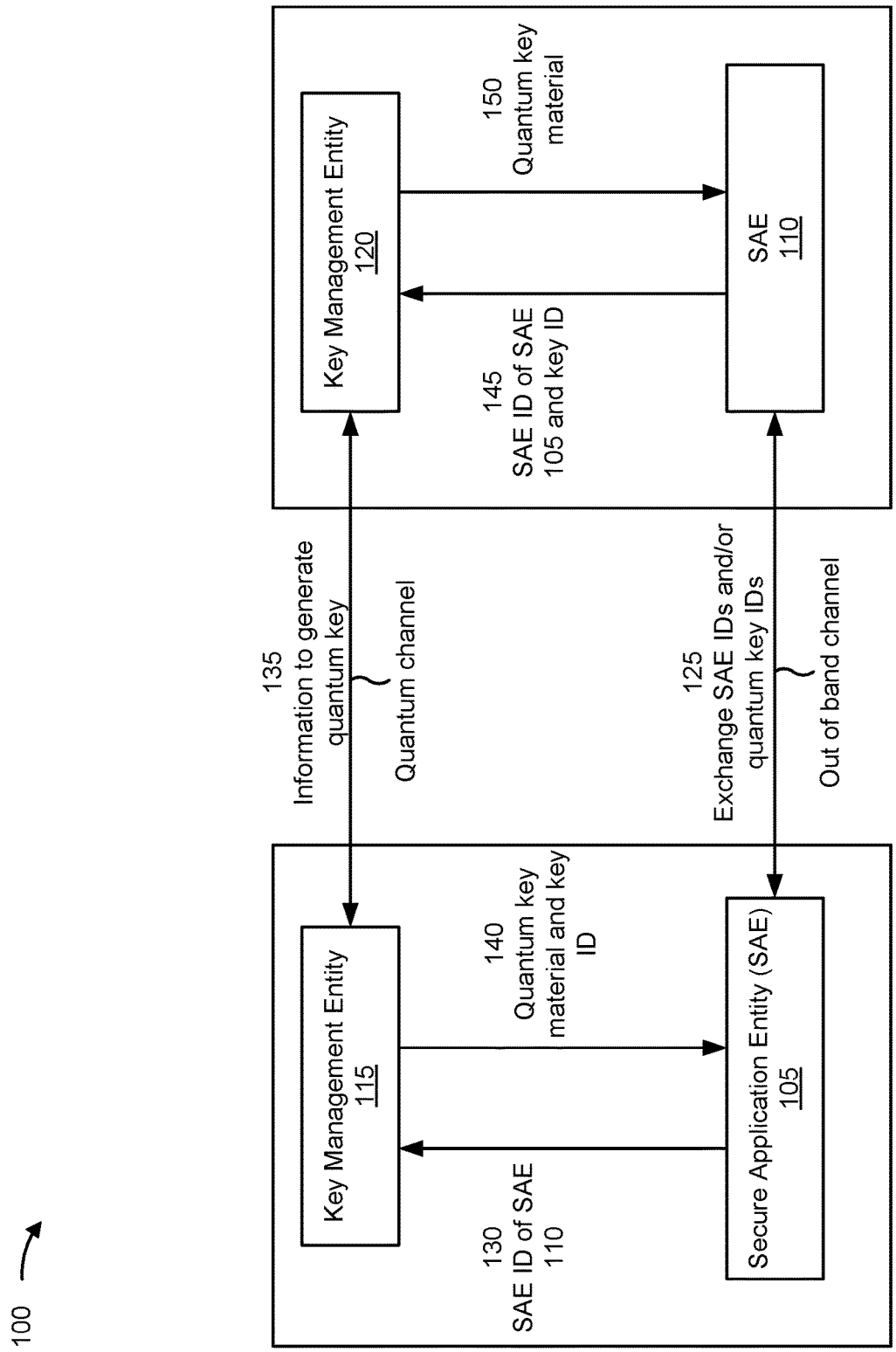
FIGS. 1-3 are diagrams of an example implementation described herein.

The following detailed description of example implementations refers to the accompanying drawings. The same reference numbers in different drawings may identify the same or similar elements.

An internet key exchange (IKE) may include a protocol that establishes a shared state between a first network device and a second network device. The shared state defines specific services provided to traffic, which cryptographic models will be utilized to provide the specific services, keys utilized as input to the cryptographic models, and/or parameters for communication of the traffic, among other examples. An IKE may be associated with a mutual authentication between the first network device and the second network device. Additionally, an IKE may enable the first network device and the second network device to establish an IKE security association (SA) that includes shared secret information that can be used to efficiently establish security associations for an encapsulating security payload (ESP) or an authentication header (AH) and a set of cryptographic models to be used by the security associations to protect traffic associated with the security associations.

The IKE protocol may be associated with asymmetric cryptographic models and/or techniques for establishing the shared secret information (e.g., the cryptographic keys). For example, the IKE protocol may be associated with a Diffie Hellman (DH) or an Elliptic Curve DH (ECDH) operation or technique to for establishing the shared secret information (e.g., the cryptographic keys). However, asymmetric cryptographic models may be vulnerable or susceptible to attack via devices, such as quantum computers, that are capable of solving the mathematical operations and/or encryption associated with the asymmetric cryptographic models. For example, devices, such as quantum computers, may have a sufficient processing capability to solve the mathematical operations and/or encryption securing the secret information (e.g., the cryptographic keys) generated via the asymmetric cryptographic models. Therefore, an IKE SA between a first network device and a second network device may be vulnerable or susceptible to attack from a malicious actor that obtains the secret information (e.g., the cryptographic keys) by solving the mathematical operations and/or encryption. In other words, to ensure security of communication between network devices, typical cryptographic schemes rely on mathematics-based algorithms (e.g., asymmetric cryptographic models). However, mathematics-based algorithms can consume significant computing resources (e.g., processing resources, memory resources, communication resources, and/or power resources, among other examples) and, with the increasing capabilities of quantum computers, data encrypted using such algorithms are vulnerable to attack.

Quantum cryptography is a cryptographic technique that exploits quantum mechanical properties to perform cryptographic tasks. For example, quantum cryptography may be associated with a physics-based algorithm (e.g., rather than a mathematics-based algorithm). One technique that utilizes quantum cryptography is quantum key distribution (QKD) (e.g., QKD is an example of a quantum cryptographic task). QKD uses quantum physics to securely agree on symmetric encryption keys. To generate a key, two QKD devices exchange quantum states (e.g., using polarized photons) by utilizing a quantum communication channel (e.g., an optical channel) or free space (e.g., a line-of-sight connection between a terrestrial QKD device and a QKD device included in a satellite). The security of encryption that uses quantum key distribution relies on the foundations of quantum mechanics, in contrast to traditional public key cryptography or asymmetric cryptography, which relies on the computational difficulty of certain mathematical functions (e.g., and cannot provide any mathematical proof as to the actual complexity of reversing the one-way functions used). QKD has provable security based on information theory and forward secrecy.

While QKD may improve the security of cryptographic keys, a protocol is still required for two network devices to establish and maintain security parameters for an SA. In other words, an IKE protocol is still required to determine and/or negotiate the security parameters for an IKE SA. In some cases, some techniques may use QKD for Internet Protocol (IP) Security (IPsec), such as associated with the IKE protocol. However, such techniques require separate negotiations to establish a quantum keys (e.g., using a QKD protocol) and to establish security parameters (e.g., using the IKE protocol). In other words, network devices may perform parallel operations associated with the IKE protocol and QKD protocol and may merge resultant keys from each protocol to secure the SA keys via quantum cryptography. This increases a complexity associated with establishing an IKE SA and also consumes additional computing resources (e.g., processing resources, memory resources, communication resources, and/or power resources, among other examples). As another example, techniques may use QKD with an IKE protocol by modifying an IKE protocol negotiation (e.g., by introducing additional signaling, additional messages, and/or additional operations). Similarly, this increases a complexity associated with establishing an IKE SA and also consumes additional computing resources (e.g., processing resources, memory resources, communication resources, and/or power resources, among other examples) associated with performing the modified IKE negotiation.

Some implementations described herein enable quantum cryptography in an IKE procedure. For example, a post-quantum preshared key (PPK) may be used in the IKE protocol. The PPK may be an additional shared secret (e.g., in addition to shared secrets already associated with the IKE protocol). The additional shared secret (e.g., the PPK) may be used to generate keys associated with the IKE protocol. The PPK may be a quantum key obtained via a QKD. For example, as part of the IKE negotiation, a first network device and a second network device may exchange identifiers (e.g., secure application entity (SAE) identifiers) to enable each network device to obtain quantum key (e.g., the PPK). In other words, a payload is introduced to an existing IKE protocol message (e.g., an IKE_INIT message) that indicates that the PPK is to be used for the IKE negotiation and an identifier (e.g., a SAE identifier) that is used to obtain the quantum key (e.g., to be used as the PPK). This enables the first network device and the second network device to obtain the quantum key (e.g., by providing the identifier of the peer network device) from a first key management entity.

For example, the first network device may request that the first key management entity generate the quantum key (e.g., via a QKD protocol) by indicating the identifier associated with the second network device (e.g., the SAE identifier of the second network device). The first network device may obtain quantum key material and an identifier of the quantum key from a first key management entity. The first network device may indicate the identifier of the quantum key to the second network device in an existing IKE protocol message (e.g., an IKE_AUTH message). The second network device may obtain the quantum key from a second key management entity (e.g., that may communicate with the first key management entity via a quantum channel) based on providing, to the second key management entity, the identifier associated with the first network device (e.g., the SAE identifier of the first network device) and the identifier of the quantum key. As a result, the first network device and the second network device may obtain a shared quantum key that can be used as the PPK for the IKE procedure.

Therefore, implementations described herein enable quantum keys to be utilized in an IKE protocol without modifying the IKE protocol negotiation. As a result, a security of the IKE SA may be improved (e.g., by utilizing quantum keys and/or QKD) without increasing a complexity associated with the IKE protocol negotiation and/or without introducing additional signaling and/or additional messages into the IKE protocol negotiation. Therefore, a security associated with the IKE SA may be improved. Further, the first network device and the second network device may conserve computing resources (e.g., processing resources, memory resources, communication resources, and/or power resources, among other examples) that would have otherwise been used integrating QKD into the IKE protocol via additional negotiations between network devices and/or additional signaling or messages in the IKE protocol.

FIG. 1 is a diagram of an example implementation 100 associated with QKD. As shown in FIG. 1, example implementation 100 includes a first SAE 105, a second SAE 110, a first key management entity 115, and a second key management entity 120. The first SAE 105 may be, may be associated with, or may be included in a first network device. The second SAE 110 may be, may be associated with, or may be included in a second network device. The first key management entity 115 may be associated with or configured for the first network device. The second key management entity 120 may be associated with and/or configured for the second network device. The first key management entity 115 and the second key management entity 120 may be QKD devices. These devices are described in more detail below in connection with FIGS. 4-6.

An SAE may be an entity of a network device associated with requesting keys (e.g., cryptographic keys). As shown in FIG. 1, and by reference number 125, the first SAE 105 and the second SAE 110 may communicate to exchange identifiers and/or other information. For example, the first SAE 105 may transmit, and the second SAE 110 may receive, an indication of an identifier associated with the first SAE 105. Similarly, the second SAE 110 may transmit, and the first SAE 105 may receive, an indication of an identifier associated with the second SAE 110. For example, two peers (e.g., the first SAE 105 and the second SAE 110) may require the identifier of the other peer in order to obtain the same quantum key from a quantum network (e.g., via QKD).

The first SAE 105 and the second SAE 110 may communicate via an out of band channel. "Out of band" channel may refer to a communication channel that is not associated with an IKE protocol or a QKD protocol. In some implementations, the out of band channel may be a public channel (e.g., a channel associated with a conventional network, such as the Internet or a wireless network).

As shown by reference number 130, the first SAE 105 may request a quantum key from the first key management entity 115. For example, the first SAE 105 may transmit the request to the first key management entity 115. The request may indicate the identifier (e.g., the SAE identifier) of the second SAE 110. In some implementations, the first SAE 105 may request the quantum key via an application programing interface (API) call. For example, the API may be a representational state transfer (REST) API associated with requesting and/or providing quantum keys via the first key management entity 115. The API call may indicate the identifier (e.g., the SAE identifier) of the second SAE 110. In other words, the identifier (e.g., the SAE identifier) of the second SAE 110 may be an input to the API.

As shown by reference number 135, the first key management entity 115 and the second key management entity 120 may communicate to cause a key to be generated. For example, the first key management entity 115 and the second key management entity 120 may be connected via a quantum channel (e.g., an optical channel that allows quantum states to be transmitted) and a public channel (e.g., a channel associated with a conventional network, such as the Internet or a wireless network). The first key management entity 115 and the second key management entity 120 then may communicate with each other via the quantum channel and the public channel using a QKD protocol (e.g., a BB84 protocol, an E91 protocol, or an entangled pair generation protocol, among other examples) to cause a quantum key to be generated. In this way, the first key management entity 115 and the second key management entity 120 may cause the quantum key to be generated that is known only to the first key management entity 115 and the second key management entity 120 at a time of generation of the quantum key.

The first key management entity 115 and/or the second key management entity 120 may determine an identifier associated with the key. For example, the first key management entity 115 and/or the second key management entity 120 may generate an identifier (e.g., a unique identifier (UID)) associated with the key and may store the quantum key and the identifier in an entry of a data structure associated with the first key management entity 115 (e.g., a database, a table, or a file included in the first key management entity 115 and/or accessible to the first key management entity 115). The identifier may be generated based on the quantum key. For example, the identifier may be a hash of the key or may be the time of generation of the quantum key. The identifier may be used to find and identify the quantum key (e.g., as an index of the entry in the data structure). Additionally, the first key management entity 115 may store the identifier (e.g., the SAE identifier) of the second SAE 110 and the identifier (e.g., the SAE identifier) of the first SAE 105 in the entry of the data structure (e.g., that is associated with, or that includes, the quantum key and the identifier of the quantum key). The second key management entity 120 may store the quantum key, the identifier of the quantum key, the identifier (e.g., the SAE identifier) of the second SAE 110, and the identifier (e.g., the SAE identifier) of the first SAE 105 in a similar manner (e.g., in one or more entries of a data structure).

As shown by reference number 140, the first key management entity 115 may transmit, and the first SAE 105 may receive, an indication of quantum key information (e.g., key material) and/or an indication of the identifier of the quantum key. The quantum key information may include the key, the identifier associated with the key, and/or other key-related information. The first SAE 105 may transmit, and the second SAE 110 may receive, an indication of the identifier of the quantum key (e.g., to enable the second SAE 110 to retrieve the quantum key from the second key management entity 120). For example, the first SAE 105 may transmit the indication of the identifier of the quantum key via an out of band channel and/or a public channel.

As shown by reference number 145, the second SAE 110 may request the quantum key from the second key management entity 120. For example, the second SAE 110 may transmit the request to the second key management entity 120. The request may indicate the identifier (e.g., the SAE identifier) of the first SAE 105 and the identifier of the quantum key. In some implementations, the second SAE 110 may request the quantum key via an API call. For example, the API may be a REST API associated with requesting a previously generated quantum key via the second key management entity 120. The API call may indicate the identifier (e.g., the SAE identifier) of the first SAE 105 and the identifier of the quantum key. In other words, the identifier (e.g., the SAE identifier) of the first SAE 105 and the identifier of the quantum key may be inputs to the API. The API may be different than the API used by the first SAE 105 to request that the quantum key be generated (e.g., as described above in connection with reference number 130).

The second key management entity 120 may use the SAE identifier of the first SAE 105 and the identifier of the quantum key to identify and/or retrieve the quantum key. For example, the second key management entity 120 may search or parse the data structure associated with the second key management entity 120 using the SAE identifier of the first SAE 105 and/or the identifier of the quantum key. The second key management entity 120 may identify one or more entries in the data structure associated with the quantum key based on parsing the data structure. The second key management entity 120 may obtain quantum key information associated with the quantum key from the one or more entries. As shown by reference number 150, the second key management entity 120 may transmit, and the second SAE 110 may receive, an indication of the quantum key information. The quantum key information may include the key, the identifier associated with the key, information indicating the time at which the quantum key was generated, key derivation information (e.g., information that is cryptographically derived from the quantum key, such as by encrypting the quantum key), and/or other key-related information, as described above.

As a result, the first SAE 105 and the second SAE 110 may be enabled to obtain a shared quantum key (e.g., that is generated via a QKD protocol). The first SAE 105 and the second SAE 110 may use the shared quantum key to improve a security of other operations, such as an IKE SA, as described in more detail elsewhere herein.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
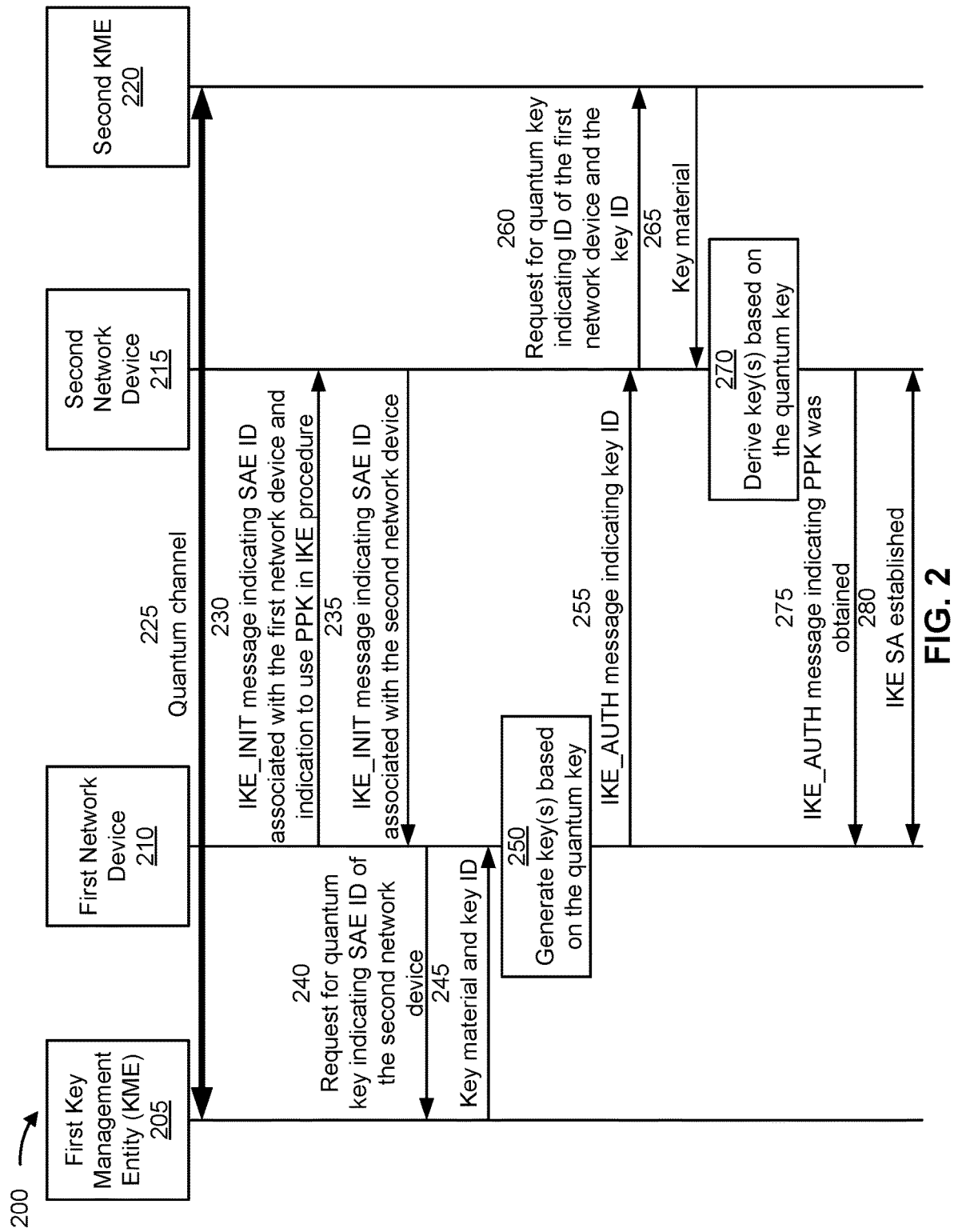

FIG. 2 is a diagram of an example implementation 200 associated with quantum cryptography in an IKE procedure. As shown in FIG. 2, example implementation 200 includes a first key management entity (KME) 205, a first network device 210, a second network device 215, and a second KME 220. In the example depicted in FIG. 2, the first network device 210 may be an initiator of an IKE procedure and the second network device 215 may be a responder of the IKE procedure. These devices are described in more detail below in connection with FIGS. 4-6.

As shown by reference number 225, the first KME 205 and the second KME 220 may communicate via a quantum channel. For example, the first KME 205 and the second KME 220 may communicate via, or may be included in, a quantum network. The first KME 205 and the second KME 220 may communicate with one another in a similar manner as described above in connection with FIG. 1 (e.g., in connection with communications between the first KME 115 and the second KME 120). The first KME 205 may be associated with the first network device 210. For example, the first network device 210 may be configured to communicate with the first KME 205 to obtain quantum keys, as described in more detail elsewhere herein. Similarly, the second KME 220 may be associated with the second network device 215. For example, the second network device 215 may be configured to communicate with the second KME 220 to obtain quantum keys, as described in more detail elsewhere herein.

As shown by reference number 230, the first network device 210 may transmit, and the second network device 215 may receive, an IKE initiation request message (e.g., an IKE_INIT message, an IKE_SA_INIT message, or a similar IKE message). The IKE initiation request message may be a communication that indicates a request to initiate an IKE procedure between the first network device 210 and the second network device 215. For example, the IKE initiation request message may indicate an SA proposal, an SA payload, an encryption and integrity algorithm, one or more keys (e.g., DH keys or other IKE keys), and/or one or more nonces, among other examples.

In some implementations, the IKE initiation request message may indicate that a PPK is to be used as a shared key for an IKE procedure. For example, the IKE initiation request message may include an indication that a PPK is to be used to generate a shared secret (e.g., a shared key) between the first network device 210 and the second network device 215. For example, the IKE initiation request message may include a notification (e.g., a notify payload) indicating that the PPK is to be used. The notification (e.g., the notify payload) may be, or may be similar to, the USE_PPK notification defined by Internet Engineering Task Force (IETF) Request For Comments (RFC) 8784 (referred to herein as "RFC 8784"). For example, the USE_PPK notification may be a status notification payload (e.g., with a type 16435, a protocol identifier of 0, no security parameter index (SPI), and no notification data). For example, RFC 8784 assumes that each peer (e.g., the first network device 210 and the second network device 215) stores a list of PPKs and respective identifiers. However, RFC 8784 does not indicate how the PPKs are to be obtained by the peers and/or what the PPKs include. As described in more detail elsewhere herein, example implementation 200 enables a quantum key to be used as the PPK while maintaining previously defined negotiation procedure and/or signaling for the IKE procedure (e.g., thereby reducing a complexity associated with introducing quantum cryptography into the IKE procedure).

For example, the IKE initiation request message may indicate a first identifier associated with the first network device 210. The first identifier may be a SAE identifier associated with the first network device 210. For example, the IKE initiation request message may include a notification of the first identifier (e.g., the SAE identifier) associated with the first network device 210. The notification may be a notify payload or a status notification payload included in the IKE initiation request message (e.g., the first identifier associated with the first network device 210 is included in a status notify payload of the IKE initiation request message). The indication of the first identifier (e.g., the SAE identifier) may be included in a notification data field of the status notify payload. The notification (e.g., the status notification payload), indicating the first identifier, included in the IKE initiation request message may have a format as depicted and described in more detail in connection with FIG. 3. As described in more detail elsewhere herein, providing the first identifier (e.g., the SAE identifier) associated with the first network device 210 to the second network device 215 may enable the second network device 215 to obtain a quantum key (e.g., to be used as the PPK) from the second KME 220.

The second network device 215 may receive the IKE initiation request message and may determine whether the second network device 215 supports an IKE procedure as requested by the first network device 210. For example, based on the IKE initiation request message including the notification to use a PPK, the second network device 215 may determine whether the second network device supports using a PPK associated with the IKE procedure. For example, the second network device 215 may determine whether the second network device 215 is configured to use the PPK as part of the IKE procedure, as described herein.

As shown by reference number 235, the second network device 215 may transmit, and the first network device 210 may receive, an IKE initiation response message (e.g., an IKE_INIT message, an IKE_SA_INIT message, or a similar IKE message). The IKE initiation response message may be responsive to the IKE initiation request message. The IKE initiation response message may be a communication that indicates a response to and/or approval to initiate the IKE procedure between the first network device 210 and the second network device 215. For example, the IKE initiation response message may indicate the SA proposal, the SA payload, the encryption and integrity algorithm(s), the one or more keys (e.g., DH keys or other IKE keys), and/or the one or more nonces, among other examples.

In some implementations, the IKE initiation response message may include an indication that the PPK is supported as the shared key for the IKE procedure by the second network device 215. For example, the IKE initiation response message may include an indication that a PPK is to be used to generate a shared secret (e.g., a shared key) between the first network device 210 and the second network device 215. For example, the IKE initiation response message may include a notification (e.g., a notify payload) indicating that the PPK is to be used. The notification (e.g., the notify payload) may be, or may be similar to, the USE_PPK notification defined by RFC 8784. In some implementations, the IKE initiation response message may include an indication of whether the PPK is mandatory for communications between the first network device 210 and the second network device 215. The first network device 210 may receive the IKE initiation response message and may determine whether the notification (e.g., a notify payload, such as the USE_PPK notification) indicating that the PPK is to be used is included in the IKE initiation response message. If the notification (e.g., the USE_PPK notification) is not included in the IKE initiation response message, then the first network device 210 may abort the IKE procedure (e.g., if the use of the PPK is indicated as being mandatory by the first network device in the IKE initiation message). If the notification (e.g., the USE_PPK notification) is included in the IKE initiation response message, then the first network device 210 may continue the IKE procedure, as described in more detail below.

In some implementations, the IKE initiation response message may include a second identifier associated with the second network device 215. The second identifier may be a SAE identifier associated with the second network device 215. For example, the IKE initiation response message may include a notification of the second identifier (e.g., the SAE identifier) associated with the second network device 215. The notification may be a notify payload or a status notification payload included in the IKE initiation response message (e.g., the second identifier associated with the second network device 215 is included in a status notify payload of the IKE initiation response message). The indication of the second identifier (e.g., the SAE identifier) may be included in a notification data field of the status notify payload. The notification (e.g., the status notification payload), indicating the first identifier, included in the IKE initiation response message may have a format as depicted and described in more detail in connection with FIG. 3. As described in more detail elsewhere herein, providing the second identifier (e.g., the SAE identifier) associated with the second network device 215 to the first network device 210 may enable the first network device 210 to obtain a quantum key (e.g., to be used as the PPK) from the first KME 205.

As a result of exchanging IKE_INIT messages (e.g., the IKE initiation request message and the IKE initiation response message) as described above, the first network device 210 and the second network device 215 may both be notified that a PPK is to be used for the IKE procedure and may both receive an identifier (e.g., a SAE identifier) of a peer for which a quantum key is to be obtained, as described in more detail elsewhere herein. The IKE_INIT messages (e.g., the IKE initiation request message and the IKE initiation response message) may be unsecured and not encrypted. However, a security of the IKE SA may be maintained because even if an attacker (e.g., a man-in-the-middle (MITM) attacker) obtains the SAE identifiers used by the first network device 210 and the second network device 215, the IKE_INIT messages (e.g., the IKE initiation request message and the IKE initiation response message) do not include any information related to the quantum network. For example, the IKE_INIT messages (e.g., the IKE initiation request message and the IKE initiation response message) do not include address information or identifiers of the first KME 205 and/or the second KME 220. Moreover, even if the attacker were to obtain the address of the first KME 205 and/or the second KME 220, the KMEs perform authentication procedures (e.g., as defined, or otherwise fixed, by a standards organization, such as the European Telecommunications Standards Institute (ETSI)) to authenticate the device requesting a quantum key. Therefore, the attacker may be unable to request a key from the quantum network (e.g., from the first KME 205 and/or the second KME 220) because the KMEs may be enabled to detect the attacker via the authentication procedures. Therefore, including the SAE identifiers in unsecured messages, such as the IKE_INIT messages (e.g., the IKE initiation request message and the IKE initiation response message) does not introduce a susceptibility to attack for the IKE procedure.

As shown by reference number 240, the first network device 210 may transmit, and the first KME 205 may receive, a request for a quantum key. The first network device 210 may request the quantum key in a similar manner as described in connection with FIG. 1 (e.g., such as in connection with reference number 130). For example, the request may indicate the second identifier (e.g., the SAE identifier) associated with the second network device 215. The request may be a request to generate a quantum key for the second network device 215 (e.g., by indicating the SAE identifier associated with the second network device 215). In some implementations, the first network device 210 may request that the quantum key be generated via an API call associated with a first API (e.g., a REST API associated with obtaining or extracting quantum keys). The first KME 205 may communicate with the second KME 220 (and/or one or more other KMEs) via the quantum channel (e.g., the quantum network) to generate the quantum key (e.g., in a similar manner as described in connection with FIG. 1). For example, the quantum key may be generated in accordance with a QKD protocol. The quantum key may be associated with the first identifier (e.g., the SAE identifier) associated with the first network device 210 and/or the second identifier (e.g., the SAE identifier) associated with the second network device 215.

As shown by reference number 245, the first KME 205 may transmit, and the first network device 210 may receive, an indication of the quantum key and an identifier associated with the quantum key (e.g., a quantum key identifier). For example, the first network device 210 may receive key material, such as the quantum key, the quantum key identifier, information indicating the time at which the quantum key was generated, key derivation information (e.g., information that is cryptographically derived from the quantum key, such as by encrypting the quantum key), and/or other key-related information.

As shown by reference number 250, the first network device 210 may generate the key(s) for the IKE procedure based on using the quantum key as the PPK. For example, the first network device 210 may generate the PPK, to be used as the shared key for the IKE procedure, based on the quantum key (e.g., the quantum key may be used as the PPK). In some implementations, the first network device 210 may generate the key(s) for the for the IKE procedure (e.g., using the quantum key as the PPK) as defined in RFC 8784. For example, the first network device 210 may compute one or more keys for the IKE procedure using key derivation procedures defined for the IKE procedure (e.g., by a standards body, such as section 2.14 of IETF RFC 7296). The first network device 210 may then generate the one or more keys for the IKE procedure using a pseudorandom function with the PPK (e.g., the quantum key) serving as the key for the pseudorandom function and the computed keys (e.g., computed in accordance with the key derivation procedures defined for the IKE procedure) being inputs to the pseudorandom function.

As shown by reference number 255, the first network device 210 may transmit, and the second network device 215 may receive, an IKE authentication request message (e.g., an IKE_AUTH message or a similar IKE message). The IKE authentication request message may be encrypted and/or authenticated via an IKE SA that is generated based on the IKE_INIT messages (e.g., the IKE initiation request message and the IKE initiation response message). The IKE authentication request message may be associated with authenticating previous IKE messages, validating the identity of IPsec peers (e.g., the second network device 215), and/or establishing a child SA (e.g., to be used to securely transmit one or more communications between the first network device 210 and the second network device 215).

In some implementations, the IKE authentication request message may include an identifier associated with the quantum key (e.g., the quantum key identifier) is associated with the PPK (e.g., is to be used as the PPK). For example, the IKE authentication request message may include an indication that the quantum key identifier is the identifier associated with the PPK. For example, the IKE authentication request message may include a PPK identity payload (e.g., a status notification payload, such as the PPK_IDENTITY payload defined by RFC 8784). The quantum key identifier may be included in the PPK identity payload of the IKE authentication request message. For example, the quantum key identifier may be included as the PPK_ID associated with the PPK_IDENTITY payload.

The second network device 215 may use the quantum key identifier (e.g., obtained via the IKE authentication request (IKE_AUTH) message) and the SAE identifier of the first network device 210 (e.g., obtained via the IKE initiation request (IKE_INIT) message) to obtain the quantum key from the second KME 220. For example, as shown by reference number 260, the second network device 215 may transmit, the second KME 220 may receive, a request for the quantum key. The second network device 215 may request the quantum key in a similar manner as described in connection with FIG. 1 (e.g., such as in connection with reference number 145). For example, the request for the quantum key may include an indication of the first identifier (e.g., the SAE identifier) associated with the first network device 210 and an indication of the quantum key identifier. In some implementations, the second network device 215 may transmit the request via an API call associated with an API (e.g., that is associated with obtaining generated keys from the quantum network).

The second KME 220 may authenticate the second network device and/or the request. The second KME 220 may identify the quantum key based on the first identifier (e.g., the SAE identifier) associated with the first network device 210 and/or the quantum key identifier. As shown by reference number 265, the second KME 220 may transmit, and the second network device 215 may receive, an indication of the quantum key. For example, the second KME 220 may transmit, and the second network device 215 may receive, key material associated with the quantum key, such as the quantum key, the quantum key identifier, information indicating the time at which the quantum key was generated, key derivation information (e.g., information that is cryptographically derived from the quantum key, such as by encrypting the quantum key), and/or other key-related information.

As shown by reference number 270, the second network device 215 may generate one or more keys associated with the IKE procedure based on the quantum key. For example, the second network device 215 may generate the PPK, to be used as the shared key for the IKE procedure, based on the quantum key. In some implementations, the second network device 215 may generate the key(s) for the IKE procedure (e.g., using the quantum key as the PPK) as defined in RFC 8784. For example, the second network device 215 may derive the one or more keys for the IKE procedure using key derivation procedures defined for the IKE procedure (e.g., by a standards body, such as section 2.14 of IETF RFC 7296) based on information included in the IKE authentication request message received from the first network device 210. For example, the second network device 215 may then derive the one or more keys for the IKE procedure using the PPK (e.g., the quantum key) as the key to derive the one or more keys for the IKE procedure. In some implementations, the second network device 215 may generate the one or more keys associated with the IKE procedure using the PPK (e.g., the quantum key) in a similar manner as described above in connection with the first network device 210 (e.g., and reference number 250).

As shown by reference number 275, the second network device 215 may transmit, and the first network device 210 may receive, an IKE authentication response message (e.g., an IKE_AUTH message). The IKE authentication response message may indicate that the PPK has been successfully obtained by the second network device 215. For example, if the second network device 215 successfully obtains the quantum key, successfully computes the one or more keys associated with the IKE procedure, and/or successfully decrypts the information received from the first network device 210, then the IKE authentication response message may include the indication that the PPK has been successfully obtained by the second network device 215 and/or that an SA (e.g., a child SA) associated with the first network device 210 and the second network device 215 is authenticated. In some implementations, the second network device 215 may indicate that the PPK (e.g., the quantum key) was successfully obtained by the second network device by including a PPK identity notification (e.g., a PPK_IDENTITY status notification payload) with no data in the IKE authentication response message. As a result, the first network device 210 may identify that the PPK was successfully obtained by the second network device 215 and/or that the SA (e.g., a child SA) associated with the first network device 210 and the second network device 215 is authenticated.

As shown by reference number 280, the first network device 210 and the second network device 215 may establish an IKE SA (e.g., a child SA) based on the first network device 210 and the second network device 215 obtaining the quantum key to be used as the shared key (e.g., the PPK). In some implementations, the IKE SA is associated with the IKEv2 protocol. However, the implementations and techniques described herein are applicable to other versions of the IKE protocol. For example, although some messages and/or signaling are described herein using terminology associated with the IKEv2 protocol, the implementations and techniques described herein may be used with similar messages associated with other versions of the IKE protocol. For example, the SAE identifiers associated with the first network device 210 and the second network device 215 may be exchanged in a first stage or first phase of the IKE protocol (e.g., an initiation phase, an unsecured phase, or a similar phase). The first network device 210 may indicate the quantum key identifier in a second stage or second phase of the IKE protocol (e.g., an authentication phase, a secured phase, or a similar phase).

Based on establishing the IKE SA, the first network device 210 and the second network device 215 may transmit one or more communications that are secured via the IKE SA. As the quantum key is used as the PPK to establish the IKE SA, the one or more communications may be secured via quantum cryptography, thereby increasing the security of the one or more communications. Therefore, implementations described herein enable quantum keys to be utilized in an IKE protocol without modifying the IKE protocol negotiation (e.g., as shown using the IKEv2 protocol as an example). As a result, a security of the IKE SA may be improved (e.g., by utilizing quantum keys and/or QKD) without increasing the complexity associated with the IKE protocol negotiation and/or without introducing additional signaling and/or additional messages into the IKE protocol negotiation. Therefore, the security associated with the IKE SA may be improved by utilizing quantum cryptography. Further, the first network device 210 and the second network device 215 may conserve computing resources (e.g., processing resources, memory resources, communication resources, and/or power resources, among other examples) that would have otherwise been used integrating QKD into the IKE protocol via additional negotiations between network devices and/or additional signaling or messages in the IKE protocol.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
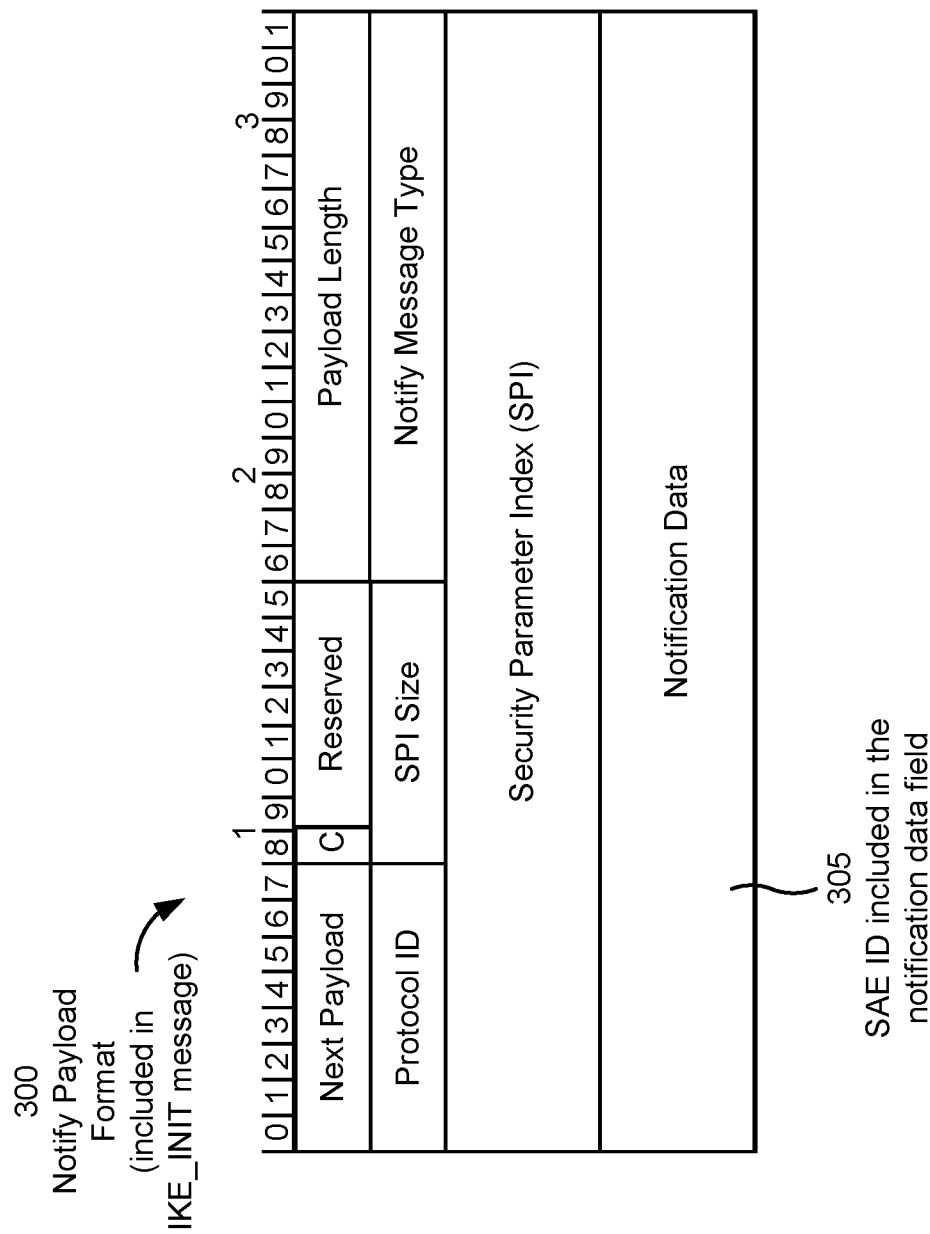

FIG. 3 is a diagram of an example 300 associated with a notification format associated with indicating a SAE identifier in an IKE protocol. As shown in FIG. 3, an indication of a SAE identifier of a network device (e.g., the first network device 210 and/or the second network device 215) may be included in a status notification (e.g., a status notification payload) of an IKE message, such as an IKE_INIT message. The notification format may be associated with a notify message type (e.g., a status type of a notify message type).

For example, the notification depicted in FIG. 3 may be included in the IKE initiation request message (e.g., transmitted by the first network device 210 as described in connection with reference number 230) to indicate the SAE identifier associated with the first network device 210. Similarly, the notification depicted in FIG. 3 may be included in the IKE initiation response message (e.g., transmitted by the second network device 215 as described in connection with reference number 235) to indicate the SAE identifier associated with the second network device 215.

The notification format for the status notification payload may be associated with a protocol identifier of 0 (zero), and the SPI size may be associated with a value of 0 (zero). The notify message type field may be associated with a value that is associated with a private status (e.g., as defined, or otherwise fixed, by a standards organization, such as the Internet Assigned Numbers Authority (IANA)), such as 41000. Alternatively, the notify message type field may be associated with a value that is defined, or otherwise fixed, by the IANA (e.g., from a value currently included in an unassigned range, as defined by the IANA). The SPI field may not include any data (e.g., the notification may not be associated with an SPI).

As shown by reference number 305, a SAE identifier may be included in the notification data field. For example, the notification payload format (e.g., associated with the status notification for the IKE_INIT message) may include the notification data field. A network device (e.g., the first network device 210 and/or the second network device 215) may include an indication of the SAE identifier associated with the network device in the notification data field so as to provide the SAE identifier to a peer, as described in more detail elsewhere herein. In some implementations, the notification data field and/or the indication of the SAE identifier may not be aligned with a byte boundary (e.g., the 4-byte boundary as depicted in FIG. 3) associated with the notification payload format.

As indicated above, FIG. 3 is provided as an example. Other examples may differ from what is described with regard to FIG. 3.

Figure 4:
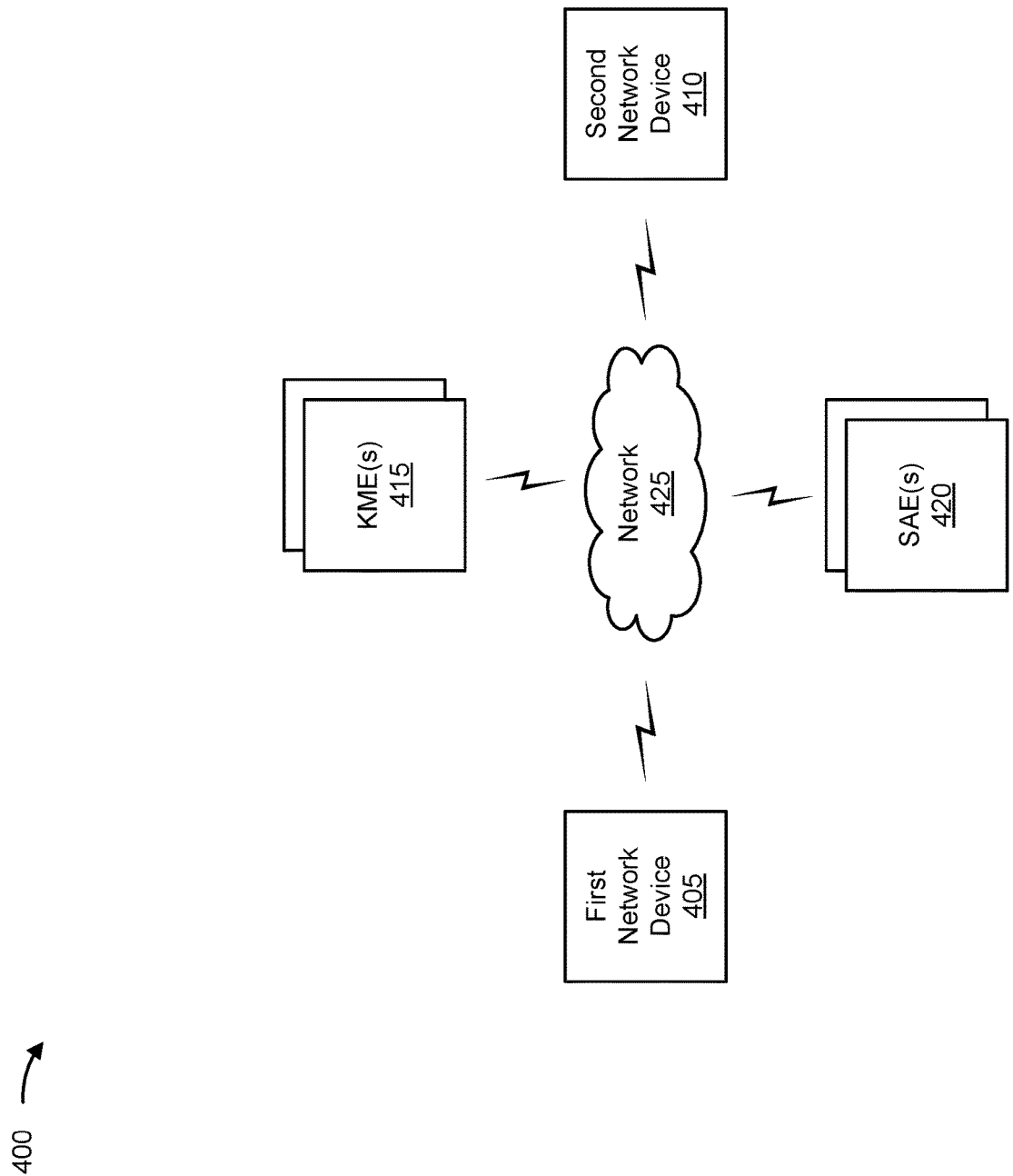
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a first network device 405, a second network device 410, one or more KMEs 415, one or more SAEs 420, and a network 425. Devices of environment 400 may interconnect via wired connections, wireless connections, or a combination of wired and wireless connections.

The first network device 405 and/or the second network device 410 includes one or more devices capable of receiving, processing, storing, routing, and/or providing traffic (e.g., a packet and/or other information or metadata) in a manner described herein. For example, the first network device 405 and/or the second network device 410 may include a router, such as a label switching router (LSR), a label edge router (LER), an ingress router, an egress router, a provider router (e.g., a provider edge router or a provider core router), a virtual router, or another type of router. Additionally, or alternatively, the first network device 405 and/or the second network device 410 may include a gateway, a switch, a firewall, a hub, a bridge, a reverse proxy, a server (e.g., a proxy server, a cloud server, or a data center server), a load balancer, and/or a similar device. In some implementations, the first network device 405 and/or the second network device 410 may be a physical device implemented within a housing, such as a chassis. In some implementations, the first network device 405 and/or the second network device 410 may be a virtual device implemented by one or more computing devices of a cloud computing environment or a data center. In some implementations, a group of network devices 405 and/or network device 410 may be a group of data center nodes that are used to route traffic flow through a network.

The KME(s) 415 includes one or more devices capable of receiving, generating, storing, processing, providing, and/or routing information associated with generating and/or indicating quantum keys, as described elsewhere herein. The KME 415 may include a communication device and/or a computing device. For example, the KME 415 may include a server, such as an application server, a client server, a web server, a database server, a host server, a proxy server, a virtual server (e.g., executing on computing hardware), or a server in a cloud computing system. In some implementations, the KME 415 includes computing hardware used in a cloud computing environment. A KME 415 may be capable of communicating via a quantum channel and/or a quantum network (e.g., an optical channel that allows quantum states to be transmitted, such as via the modulated light). In some implementations, a KME 415 includes, or is associated with a device that includes, a wave plate, a beamsplitter, an electro-optic modulator, a laser transmitter, an optical waveform generator, and/or other components associated with transmission and/or reception of a quantum key. In some implementations, a KME 415 may be configured to, or may be associated with a device that is configured to, transmit and/or receive modulated light that includes multiple spatial nodes that are associated with the quantum key.

The SAE(s) 420 includes one or more devices capable of receiving, generating, storing, processing, providing, and/or routing information associated with obtaining quantum keys associated with a network device, as described elsewhere herein. The SAE 420 may include a communication device and/or a computing device. For example, the SAE 420 may include a server, such as an application server, a client server, a web server, a database server, a host server, a proxy server, a virtual server (e.g., executing on computing hardware), or a server in a cloud computing system. In some implementations, the SAE 420 includes computing hardware used in a cloud computing environment. In some implementations, a SAE 420 may be included in, or associated with, a network device (e.g., the first network device 405 and/or the second network device 410).

The network 425 includes one or more wired and/or wireless networks. For example, the network 425 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 425 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
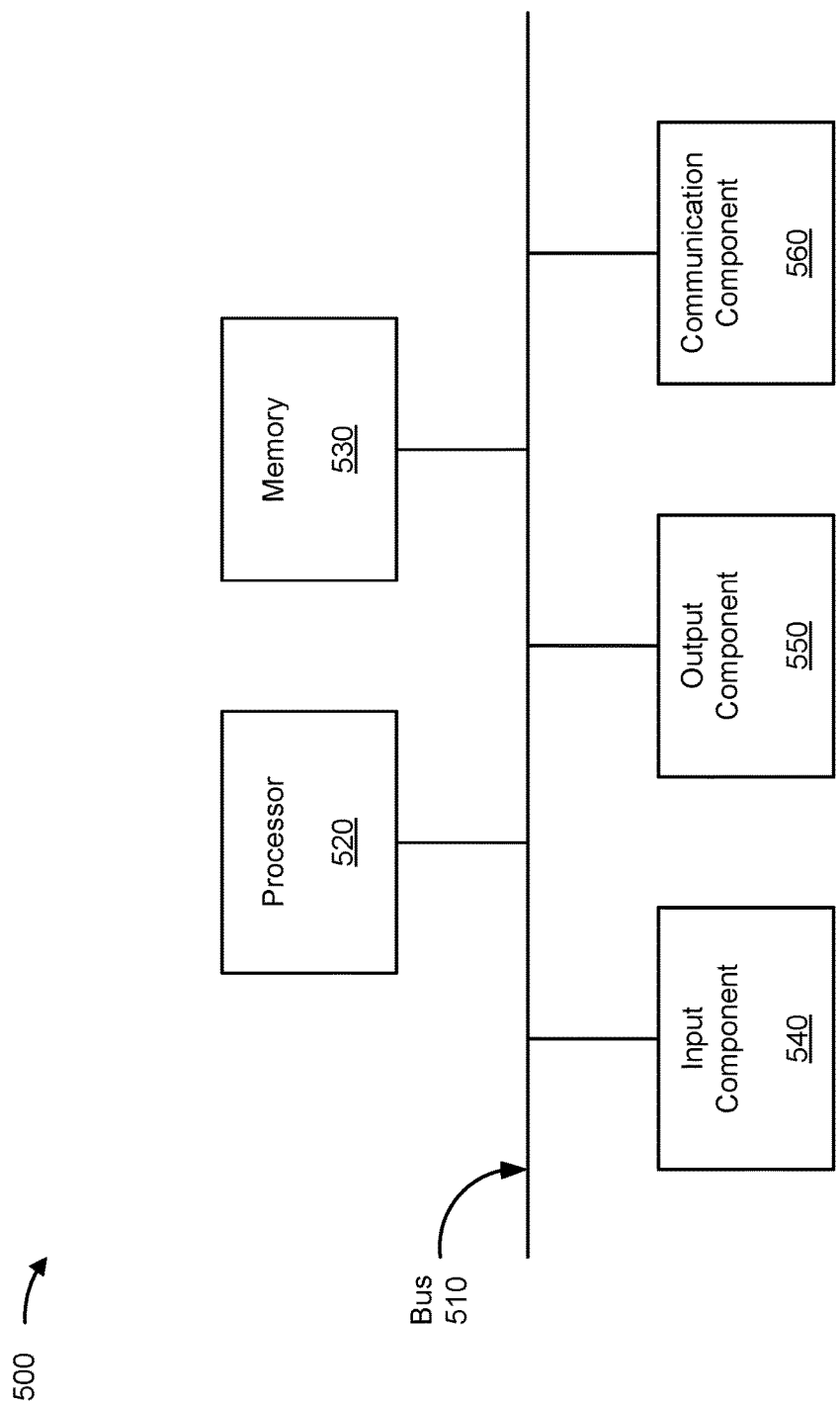
FIGS. 5-6 are diagrams of example components of one or more devices of FIG. 4.

FIG. 5 is a diagram of example components of a device 500, which may correspond to a network device (e.g., the first network device 210, the first network device 405, the second network device 215, and/or the second network device 410), a KME (e.g., the first KME 115, the second KME 120, the first KME 205, the second KME 220, and/or the KME(s) 415), and/or a SAE (e.g., the first SAE 105, the second SAE 110, and/or the SAE(s) 420), among other examples. In some implementations, a network device (e.g., the first network device 210, the first network device 405, the second network device 215, and/or the second network device 410), a KME (e.g., the first KME 115, the second KME 120, the first KME 205, the second KME 220, and/or the KME(s) 415), and/or a SAE (e.g., the first SAE 105, the second SAE 110, and/or the SAE(s) 420) include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
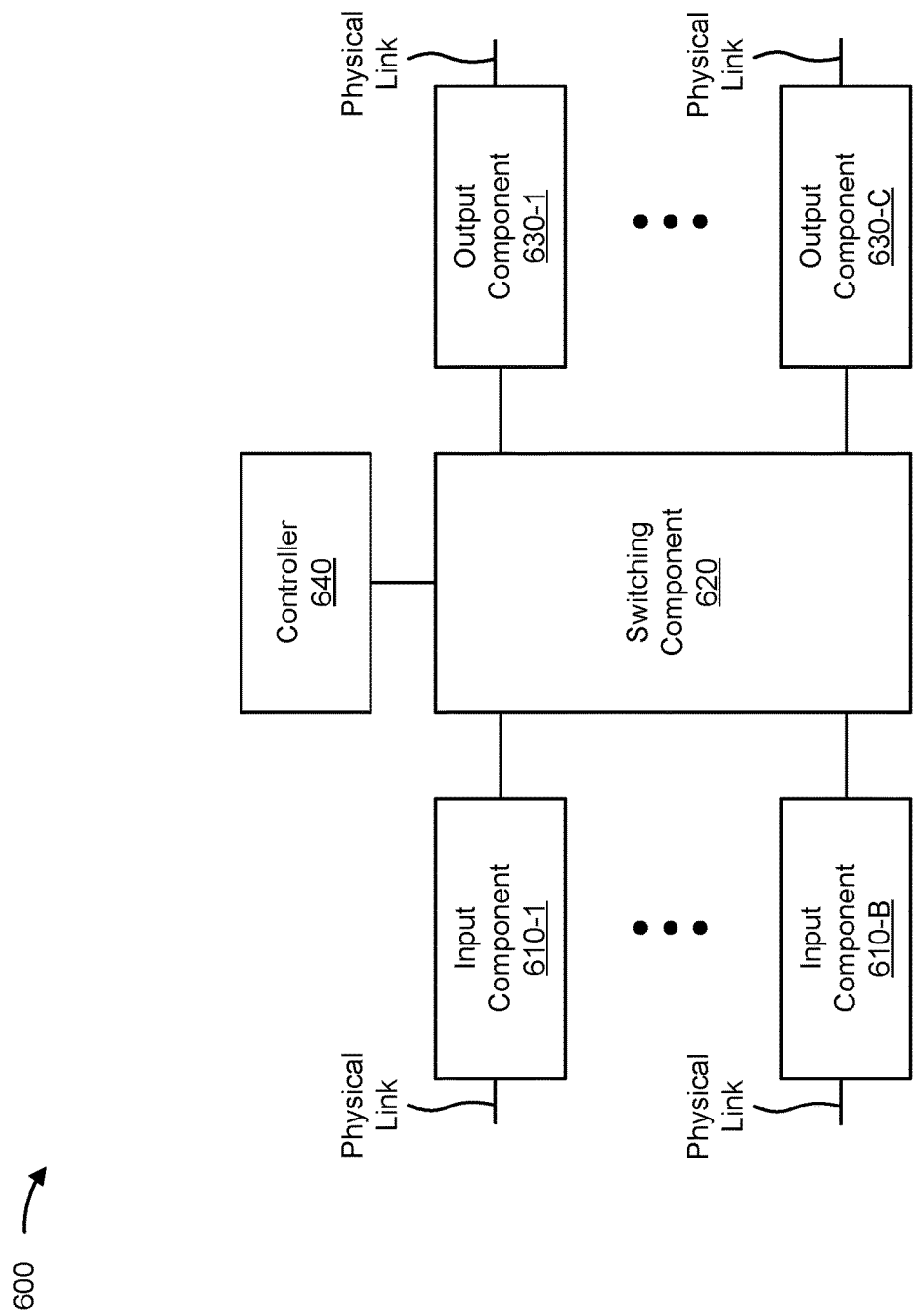

FIG. 6 is a diagram of example components of a device 600. Device 600 may correspond to a network device (e.g., the first network device 210, the first network device 405, the second network device 215, and/or the second network device 410), a KME (e.g., the first KME 115, the second KME 120, the first KME 205, the second KME 220, and/or the KME(s) 415), and/or a SAE (e.g., the first SAE 105, the second SAE 110, and/or the SAE(s) 420), among other examples. In some implementations, a network device (e.g., the first network device 210, the first network device 405, the second network device 215, and/or the second network device 410), a KME (e.g., the first KME 115, the second KME 120, the first KME 205, the second KME 220, and/or the KME(s) 415), and/or a SAE (e.g., the first SAE 105, the second SAE 110, and/or the SAE(s) 420), may include one or more devices 600 and/or one or more components of device 600. As shown in FIG. 6, device 600 may include one or more input components 610-1 through 610-B (B≥1) (hereinafter referred to collectively as input components 610, and individually as input component 610), a switching component 620, one or more output components 630-1 through 630-C(C≥1) (hereinafter referred to collectively as output components 630, and individually as output component 630), and a controller 640.

Input component 610 may be one or more points of attachment for physical links and may be one or more points of entry for incoming traffic, such as packets. Input component 610 may process incoming traffic, such as by performing data link layer encapsulation or decapsulation. In some implementations, input component 610 may transmit and/or receive packets. In some implementations, input component 610 may include an input line card that includes one or more packet processing components (e.g., in the form of integrated circuits), such as one or more interface cards (IFCs), packet forwarding components, line card controller components, input ports, processors, memories, and/or input queues. In some implementations, device 600 may include one or more input components 610.

Switching component 620 may interconnect input components 610 with output components 630. In some implementations, switching component 620 may be implemented via one or more crossbars, via busses, and/or with shared memories. The shared memories may act as temporary buffers to store packets from input components 610 before the packets are eventually scheduled for delivery to output components 630. In some implementations, switching component 620 may enable input components 610, output components 630, and/or controller 640 to communicate with one another.

Output component 630 may store packets and may schedule packets for transmission on output physical links. Output component 630 may support data link layer encapsulation or decapsulation, and/or a variety of higher-level protocols. In some implementations, output component 630 may transmit packets and/or receive packets. In some implementations, output component 630 may include an output line card that includes one or more packet processing components (e.g., in the form of integrated circuits), such as one or more IFCs, packet forwarding components, line card controller components, output ports, processors, memories, and/or output queues. In some implementations, device 600 may include one or more output components 630. In some implementations, input component 610 and output component 630 may be implemented by the same set of components (e.g., an input/output component may be a combination of input component 610 and output component 630).

Controller 640 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 640 may include one or more processors that can be programmed to perform a function.

In some implementations, controller 640 may include a RAM, a ROM, and/or another type of dynamic or static storage device (e.g., a flash memory, a magnetic memory, an optical memory, etc.) that stores information and/or instructions for use by controller 640.

In some implementations, controller 640 may communicate with other devices, networks, and/or systems connected to device 600 to exchange information regarding network topology. Controller 640 may create routing tables based on the network topology information, may create forwarding tables based on the routing tables, and may forward the forwarding tables to input components 610 and/or output components 630. Input components 610 and/or output components 630 may use the forwarding tables to perform route lookups for incoming and/or outgoing packets.

Controller 640 may perform one or more processes described herein. Controller 640 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 640 from another computer-readable medium or from another device via a communication interface. When executed, software instructions stored in a memory and/or storage component associated with controller 640 may cause controller 640 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
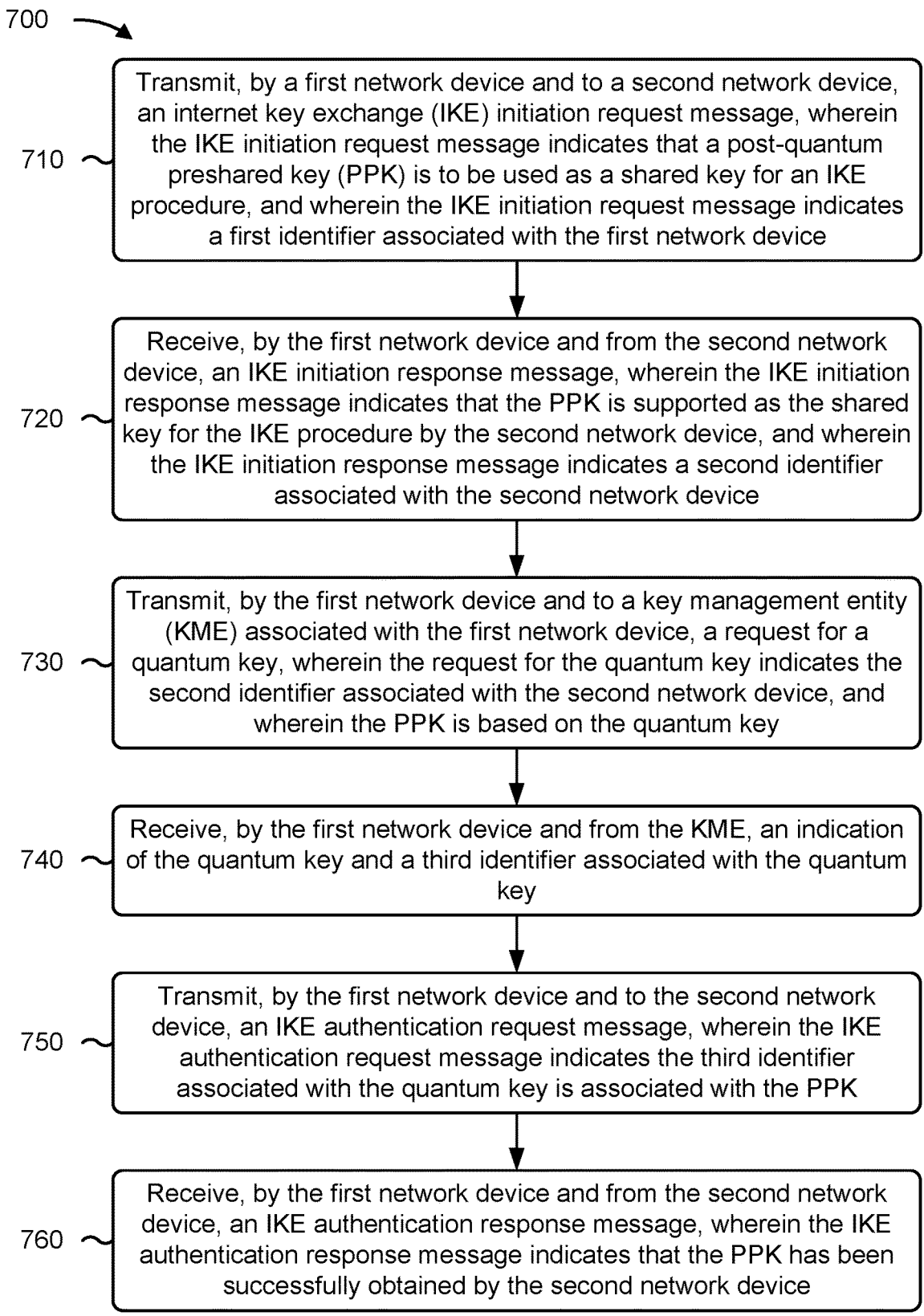

FIG. 7 is a flowchart of an example process 700 associated with quantum cryptography in an IKE procedure. In some implementations, one or more process blocks of FIG. 7 are performed by a first network device (e.g., the first network device 210 and/or the first network device 405). In some implementations, one or more process blocks of FIG. 7 are performed by another device or a group of devices separate from or including the first network device, such as a second network device (e.g., the second network device 215 and/or the second network device 410), a KME (e.g., the first KME 205, the second KME 220, and/or a KME 415), and/or a SAE (e.g., a SAE 420). Additionally, or alternatively, one or more process blocks of FIG. 7 may be performed by one or more components of device 500, such as processor 520, memory 530, input component 540, output component 550, and/or communication component 560. Additionally, or alternatively, one or more process blocks of FIG. 7 may be performed by one or more components of device 600, such as an input component 610, the switching component 620, an output component 630, and/or the controller 640.

As shown in FIG. 7, process 700 may include transmitting, to a second network device, an IKE initiation request message, wherein the IKE initiation request message indicates that a PPK is to be used as a shared key for an IKE procedure, and wherein the IKE initiation request message indicates a first identifier associated with the first network device (block 710). For example, the first network device may transmit, to a second network device, an IKE initiation request message, wherein the IKE initiation request message indicates that a PPK is to be used as a shared key for an IKE procedure, and wherein the IKE initiation request message indicates a first identifier associated with the first network device, as described above.

As further shown in FIG. 7, process 700 may include receiving, from the second network device, an IKE initiation response message, wherein the IKE initiation response message indicates that the PPK is supported as the shared key for the IKE procedure by the second network device, and wherein the IKE initiation response message indicates a second identifier associated with the second network device (block 720). For example, the first network device may receive, from the second network device, an IKE initiation response message, wherein the IKE initiation response message indicates that the PPK is supported as the shared key for the IKE procedure by the second network device, and wherein the IKE initiation response message indicates a second identifier associated with the second network device, as described above.

As further shown in FIG. 7, process 700 may include transmitting, to a KME associated with the first network device, a request for a quantum key, wherein the request for the quantum key indicates the second identifier associated with the second network device, and wherein the PPK is based on the quantum key (block 730). For example, the first network device may transmit, to a KME associated with the first network device, a request for a quantum key, wherein the request for the quantum key indicates the second identifier associated with the second network device, and wherein the PPK is based on the quantum key, as described above.

As further shown in FIG. 7, process 700 may include receiving, from the KME, an indication of the quantum key and a third identifier associated with the quantum key (block 740). For example, the first network device may receive, from the KME, an indication of the quantum key and a third identifier associated with the quantum key, as described above.

As further shown in FIG. 7, process 700 may include transmitting, to the second network device, an IKE authentication request message, wherein the IKE authentication request message indicates that the third identifier associated with the quantum key is associated with the PPK (block 750). For example, the first network device may transmit, to the second network device, an IKE authentication request message, wherein the IKE authentication request message indicates that the third identifier associated with the quantum key is associated with the PPK, as described above.

As further shown in FIG. 7, process 700 may include receiving, from the second network device, an IKE authentication response message, wherein the IKE authentication response message indicates that the PPK has been successfully obtained by the second network device (block 760). For example, the first network device may receive, from the second network device, an IKE authentication response message, wherein the IKE authentication response message indicates that the PPK has been successfully obtained by the second network device, as described above.

Process 700 may include additional implementations, such as any single implementation or any combination of implementations described below and/or in connection with one or more other processes described elsewhere herein.

In a first implementation, the first identifier is associated with a first SAE of the first network device, and wherein the second identifier is associated with a second SAE of the second network device. In a second implementation, alone or in combination with the first implementation, the quantum key is generated in accordance with a QKD protocol and is associated with the first identifier and second identifier.

In a third implementation, alone or in combination with one or more of the first and second implementations, process 700 includes generating the PPK, to be used as the shared key for the IKE procedure, based on the quantum key.

In a fourth implementation, alone or in combination with one or more of the first through third implementations, the first identifier associated with the first network device is included in a status notify payload of the IKE initiation request message. In a fifth implementation, alone or in combination with one or more of the first through fourth implementations, the first identifier associated with the first network device is included in a notification data field of the status notify payload.

In a sixth implementation, alone or in combination with one or more of the first through fifth implementations, the third identifier associated with the quantum key is included in a PPK identity payload of the IKE authentication request message.

In a seventh implementation, alone or in combination with one or more of the first through sixth implementations, process 700 includes establishing, with the second network device, an IKE SA based on the first network device and the second network device obtaining the quantum key to be used as the shared key.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

Figure 8:
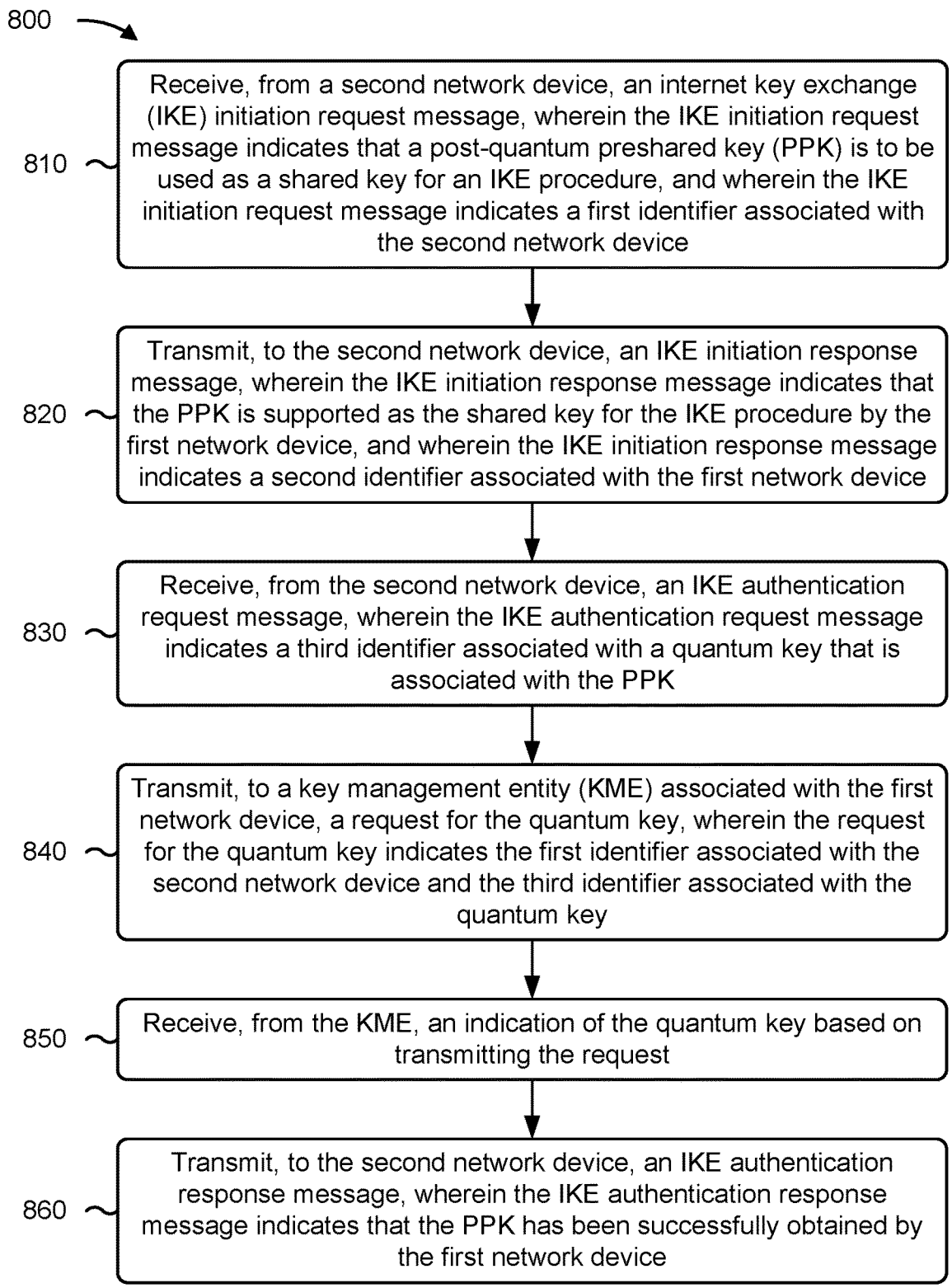

FIG. 8 is a flowchart of an example process 800 associated with quantum cryptography in an IKE procedure. In some implementations, one or more process blocks of FIG. 8 are performed by a first network device (e.g., the second network device 215 and/or the second network device 410). In some implementations, one or more process blocks of FIG. 8 are performed by another device or a group of devices separate from or including the first network device, such as a second network device (e.g., the first network device 210 and/or the first network device 405), a KME (e.g., the first KME 205, the second KME 220, and/or a KME 415), and/or a SAE (e.g., a SAE 420). Additionally, or alternatively, one or more process blocks of FIG. 8 may be performed by one or more components of device 500, such as processor 520, memory 530, input component 540, output component 550, and/or communication component 560. Additionally, or alternatively, one or more process blocks of FIG. 7 may be performed by one or more components of device 600, such as an input component 610, the switching component 620, an output component 630, and/or the controller 640.

As shown in FIG. 8, process 800 may include receiving, from a second network device, an IKE initiation request message, wherein the IKE initiation request message indicates that a PPK is to be used as a shared key for an IKE procedure, and wherein the IKE initiation request message indicates a first identifier associated with the second network device (block 810). For example, the first network device may receive, from a second network device, an IKE initiation request message, wherein the IKE initiation request message indicates that a PPK is to be used as a shared key for an IKE procedure, and wherein the IKE initiation request message indicates a first identifier associated with the second network device, as described above.

As further shown in FIG. 8, process 800 may include transmitting, to the second network device, an IKE initiation response message, wherein the IKE initiation response message indicates that the PPK is supported as the shared key for the IKE procedure by the first network device, and wherein the IKE initiation response message indicates a second identifier associated with the first network device (block 820). For example, the first network device may transmit, to the second network device, an IKE initiation response message, wherein the IKE initiation response message indicates that the PPK is supported as the shared key for the IKE procedure by the first network device, and wherein the IKE initiation response message indicates a second identifier associated with the first network device, as described above.

As further shown in FIG. 8, process 800 may include receiving, from the second network device, an IKE authentication request message, wherein the IKE authentication request message indicates a third identifier associated with a quantum key that is associated with the PPK (block 830). For example, the first network device may receive, from the second network device, an IKE authentication request message, wherein the IKE authentication request message indicates a third identifier associated with a quantum key that is associated with the PPK, as described above.

As further shown in FIG. 8, process 800 may include transmitting, to a KME associated with the first network device, a request for the quantum key, wherein the request for the quantum key indicates the first identifier associated with the second network device and the third identifier associated with the quantum key (block 840). For example, the first network device may transmit to a KME associated with the first network device, a request for the quantum key, wherein the request for the quantum key indicates the first identifier associated with the second network device and the third identifier associated with the quantum key, as described above.

As further shown in FIG. 8, process 800 may include receiving, from the KME, an indication of the quantum key based on transmitting the request (block 850). For example, the first network device may receive, from the KME, an indication of the quantum key based on transmitting the request, as described above.

As further shown in FIG. 8, process 800 may include transmitting, to the second network device, an IKE authentication response message, wherein the IKE authentication response message indicates that the PPK has been successfully obtained by the first network device (block 860). For example, the first network device may transmit, to the second network device, an IKE authentication response message, wherein the IKE authentication response message indicates that the PPK has been successfully obtained by the first network device, as described above.

Process 800 may include additional implementations, such as any single implementation or any combination of implementations described below and/or in connection with one or more other processes described elsewhere herein.

In a first implementation, the first identifier is associated with a first SAE of the second network device, and wherein the second identifier is associated with a second SAE of the first network device. In a second implementation, alone or in combination with the first implementation, the quantum key is generated in accordance with a QKD protocol.

In a third implementation, alone or in combination with one or more of the first and second implementations, process 800 includes generating the PPK, to be used as the shared key for the IKE procedure, based on the quantum key.

In a fourth implementation, alone or in combination with one or more of the first through third implementations, the first identifier associated with the second network device is included in a status notify payload of the IKE initiation request message, and wherein an indication that the PPK is to be used as the shared key for the IKE procedure is included in a use PPK payload of the IKE initiation request message.

In a fifth implementation, alone or in combination with one or more of the first through fourth implementations, the third identifier associated with the quantum key is included in a PPK identity payload of the IKE authentication request message.

In a sixth implementation, alone or in combination with one or more of the first through fifth implementations, process 800 includes transmitting, to an API associated with the KME, an API call indicating the first identifier associated with the second network device and the third identifier associated with the quantum key.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

FIG. 9 is a flowchart of an example process 900 associated with quantum cryptography in an IKE procedure. In some implementations, one or more process blocks of FIG. 9 are performed by a first network device (e.g., the first network device 210 and/or the first network device 405). In some implementations, one or more process blocks of FIG. 9 are performed by another device or a group of devices separate from or including the first network device, such as a second network device (e.g., the second network device 215 and/or the second network device 410), a KME (e.g., the first KME 205, the second KME 220, and/or a KME 415), and/or a SAE (e.g., a SAE 420). Additionally, or alternatively, one or more process blocks of FIG. 7 may be performed by one or more components of device 500, such as processor 520, memory 530, input component 540, output component 550, and/or communication component 560. Additionally, or alternatively, one or more process blocks of FIG. 7 may be performed by one or more components of device 600, such as an input component 610, the switching component 620, an output component 630, and/or the controller 640.

As shown in FIG. 9, process 900 may include communicating, with a second network device, one or more IKE messages to exchange a first identifier associated with the first network device and a second identifier associated with the second network device, and to indicate that a PPK is to be used as a shared key for an IKE SA between the first network device and the second network device (block 910). For example, the first network device may communicate, with a second network device, one or more IKE messages to exchange a first identifier associated with the first network device and a second identifier associated with the second network device, and to indicate that a PPK is to be used as a shared key for an IKE SA between the first network device and the second network device, as described above.

As further shown in FIG. 9, process 900 may include obtaining, from a KME, a quantum key based on providing the second identifier to the KME, wherein the PPK is based on the quantum key (block 920). For example, the first network device may obtain, from a KME, a quantum key based on providing the second identifier to the KME, wherein the PPK is based on the quantum key, as described above.

As further shown in FIG. 9, process 900 may include communicating, with the second network device, one or more IKE authentication messages to exchange a third identifier associated with the quantum key and to confirm that the second network device successfully obtained the PPK (block 930). For example, the first network device may communicate, with the second network device, one or more IKE authentication messages to exchange a third identifier associated with the quantum key and to confirm that the second network device successfully obtained the PPK, as described above.

As further shown in FIG. 9, process 900 may include establishing, with the second network device, the IKE SA based on receiving an indication that the second network device successfully obtained the PPK that is based on the quantum key (block 940). For example, the first network device may establish, with the second network device, the IKE SA based on receiving an indication that the second network device successfully obtained the PPK that is based on the quantum key, as described above.

Process 900 may include additional implementations, such as any single implementation or any combination of implementations described below and/or in connection with one or more other processes described elsewhere herein.

In a first implementation, process 900 includes generating the PPK based on the quantum key and in accordance with an IKE protocol.

In a second implementation, alone or in combination with the first implementation, process 900 includes transmitting, to the second network device, an IKE initiation request message indicating the first identifier in a notify payload of the IKE initiation request message, and receiving, from the second network device, an IKE initiation response message indicating the second identifier in a notify payload of the IKE initiation response message.

In a third implementation, alone or in combination with one or more of the first and second implementations, process 900 includes transmitting, to the second network device, an IKE authentication request message indicating the third identifier associated with the quantum key in a PPK identity payload of the IKE authentication request message, and receiving, from the second network device, an IKE authentication response message indicating that the PPK has been successfully obtained by the second network device.

In a fourth implementation, alone or in combination with one or more of the first through third implementations, the IKE SA is associated with the IKEv2 protocol.

Although FIG. 9 shows example blocks of process 900, in some implementations, process 900 includes additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   transmitting, by a first network device and to a second network device, an internet key exchange (IKE) initiation request message,
   wherein the IKE initiation request message indicates that a post-quantum preshared key (PPK) is to be used as a shared key for an IKE procedure;
   receiving, by the first network device and based on the IKE initiation request message, an IKE initiation response message,
   wherein the IKE initiation response message indicates that the PPK is supported as the shared key for the IKE procedure associated with the second network device;
   transmitting, by the first network device and to the second network device, an IKE authentication request message,
   wherein the IKE authentication request message indicates that an identifier associated with a quantum key is associated with the PPK; and
   receiving, by the first network device and based on the IKE authentication request message, an IKE authentication response message,
   wherein the IKE authentication response message indicates that the PPK has been successfully obtained by the second network device.

2. The method of claim 1, comprising:
   transmitting a request for the quantum key, wherein the PPK is based on the quantum key; and
   receiving an indication of the quantum key and the identifier associated with the quantum key.

3. The method of claim 1, comprising:
   enabling the first network device and the second network device to establish an IKE security association (SA) that includes shared secret information that can be used to establish security associations for an encapsulating security payload (ESP) or an authentication header (AH) and a set of cryptographic models to be used by the SA.

4. The method of claim 1, wherein the quantum key is utilized in an IKE protocol without modifying an IKE protocol negotiation.

5. The method of claim 1, wherein a first key management entity is configured for the first network device, a second key management entity is configured for the second network device, and the first key management entity and the second key management entity are quantum key distribution (QKD) devices.

6. The method of claim 1, wherein the identifier is used to find and identify the quantum key as an index of an entry in a data structure.

7. The method of claim 1, wherein the identifier is one or more of:
   a hash of the quantum key, or
   a time of generation of the quantum key.

8. A first network device, comprising:
   one or more memories; and
   one or more processors to:
   receive an internet key exchange (IKE) initiation request message,
   wherein the IKE initiation request message indicates that a post-quantum preshared key (PPK) is to be used as a shared key for an IKE procedure associated with a second network device;
   transmit, to the second network device and based on the IKE initiation request message, an IKE initiation response message,
   wherein the IKE initiation response message indicates that the PPK is supported as the shared key for the IKE procedure by the first network device;
   receive an IKE authentication request message,
   wherein the IKE authentication request message indicates a PPK identity payload; and transmit, to the second network device and based on the IKE authentication request message, an IKE authentication response message,
wherein the IKE authentication response message indicates that the PPK has been successfully obtained by the first network device.

9. The first network device of claim 8, wherein the PPK identity payload is a status notification payload, and
wherein a quantum key identifier is included in the PPK identity payload.

10. The first network device of claim 8, wherein the one or more processors are further to:
generate the PPK based on a quantum key.

11. The first network device of claim 8, wherein the one or more processors, when receiving the IKE initiation request message, are to:
receive the IKE initiation request message via an application programming interface.

12. The first network device of claim 8, wherein the one or more processors are further to:
transmit a request for a quantum key based on receiving an authentication request message; and
receive an indication of the quantum key based on transmitting the request.

13. The first network device of claim 8, wherein the one or more processors are further to:
establish an IKE security association (SA) based on the first network device and the second network device obtaining a quantum key to be used as the PPK.

14. The first network device of claim 8, wherein a first identifier is associated with a first secure application entity (SAE) of the first network device,
wherein a second identifier is associated with a second SAE of the second network device, and
wherein a quantum key is generated in accordance with a quantum key distribution (QKD) protocol and is associated with the first identifier and second identifier.

15. A non-transitory computer-readable medium storing a set of instructions, the set of instructions comprising:
one or more instructions that, when executed by one or more processors of a first network device, cause the first network device to:
communicate, with a second network device, one or more internet key exchange (IKE) messages to indicate that a post-quantum preshared key (PPK) is to be used as a shared key for an IKE security association (SA) between the first network device and the second network device;
communicate, with the second network device, one or more IKE authentication messages to exchange an identifier associated with a quantum key and to confirm that the second network device successfully obtained the PPK; and
establish, with the second network device, the IKE SA based on receiving an indication that the second network device successfully obtained the PPK that is based on the quantum key.

16. The non-transitory computer-readable medium of claim 15, wherein an identifier associated with the quantum key is included in a PPK identity payload of an IKE authentication request message.

17. The non-transitory computer-readable medium of claim 15, wherein the quantum key is generated in accordance with a quantum key distribution (QKD) protocol.

18. The non-transitory computer-readable medium of claim 15, wherein the one or more instructions, that cause the one or more processors to communicate one or more IKE authentication messages, cause the one or more processors to:
transmit an IKE authentication request message indicating an identifier associated with the quantum key in a PPK identity payload of the IKE authentication request message; and
receive an IKE authentication response message indicating that the PPK has been successfully obtained by the second network device.

19. The non-transitory computer-readable medium of claim 15, wherein the one or more instructions further cause the one or more processors to:
establish an IKE SA based on the first network device and the second network device obtaining the quantum key to be used as the PPK.

20. The non-transitory computer-readable medium of claim 15, wherein a first key management entity is configured for the first network device, a second key management entity is configured for the second network device, and the first key management entity and the second key management entity are quantum key distribution (QKD) devices.

* * * * *